US012617515B2

(12) United States Patent
Watanabe et al.

(10) Patent No.: US 12,617,515 B2
(45) Date of Patent: May 5, 2026

(54) MARINE VESSEL INCLUDING STEERING MECHANISM FOR MARINE VESSEL

(71) Applicant: YAMAHA HATSUDOKI KABUSHIKI KAISHA, Iwata (JP)

(72) Inventors: Yoshikazu Watanabe, Shizuoka (JP); Takuya Murayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 403 days.

(21) Appl. No.: 17/976,979

(22) Filed: Oct. 31, 2022

(65) Prior Publication Data

US 2023/0150642 A1 May 18, 2023

(30) Foreign Application Priority Data

Nov. 17, 2021 (JP) .................................. 2021-187174

(51) Int. Cl.
| | |
|---|---|
| *B63H 25/04* | (2006.01) |
| *B63B 79/40* | (2020.01) |
| *B63H 25/02* | (2006.01) |
| *G05D 1/00* | (2024.01) |

(52) U.S. Cl.
CPC ............. *B63H 25/04* (2013.01); *B63B 79/40* (2020.01); *G05D 1/0206* (2013.01); *B63H 2025/022* (2013.01)

(58) Field of Classification Search
None
See application file for complete search history.

(56) References Cited

U.S. PATENT DOCUMENTS

| | | | | |
|---|---|---|---|---|
| 5,707,262 A | * | 1/1998 | Huntley | ................. B63H 20/10 74/484 R |
| 7,278,367 B1 | * | 10/2007 | Gonring | ............... B63H 21/213 200/61.57 |
| 9,690,295 B1 | | 6/2017 | Abellera et al. | |
| 9,809,292 B1 | * | 11/2017 | Gonring | .............. G05D 1/0206 |
| 10,640,190 B1 | * | 5/2020 | Gonring | ................ B63H 25/02 |
| 2011/0166724 A1 | | 7/2011 | Hiramatsu | |
| 2018/0273152 A1 | | 9/2018 | Koyano et al. | |

FOREIGN PATENT DOCUMENTS

JP 2011-140272 A 7/2011

OTHER PUBLICATIONS

Extended European Search Report in EP22202737.7, mailed Apr. 17, 2023, 9 pages.

* cited by examiner

*Primary Examiner* — Angela Y Ortiz
*Assistant Examiner* — Torrence S Marunda, II
(74) *Attorney, Agent, or Firm* — Keating & Bennett, LLP

(57) ABSTRACT

A marine vessel including a steering mechanism that includes a steering wheel including shift switches to cause the marine vessel to shift to a course holding mode to hold a course of the marine vessel, and a traveling direction maintaining mode to maintain a traveling direction of the marine vessel.

11 Claims, 10 Drawing Sheets

MARINE VESSEL INCLUDING STEERING MECHANISM FOR MARINE VESSEL

CROSS REFERENCE TO RELATED APPLICATIONS

This application claims the benefit of priority to Japanese Patent Application No. 2021-187174, filed on Nov. 17, 2021. The entire contents of this application are hereby incorporated herein by reference.

BACKGROUND OF THE INVENTION

1. Field of the Invention

The present invention relates to a marine vessel including a steering mechanism.

2. Description of the Related Art

In recent years, with the aim of reducing the burden on a marine vessel operator, a marine vessel is configured to be able to set an autopilot mode in which the marine vessel automatically holds its course or the marine vessel automatically maintains its traveling direction without the marine vessel operator having to operate a steering wheel or a remote controller. In addition, when a passenger fishes, the marine vessel is configured to also be able to set a fixed point holding mode which automatically controls the movement of the marine vessel when the marine vessel is stopped so that the marine vessel stays at one point (for example, see Japanese Laid-Open Patent Publication (kokai) No. 2011-140272).

Conventionally, although automatic maneuvering switches that cause the marine vessel to shift to the autopilot mode and the fixed point holding mode, respectively, are provided on a panel or a joystick located at a maneuvering seat, since there is not much space for the panel or the joystick located at the maneuvering seat, providing the automatic maneuvering switches on the panel or the joystick located at the maneuvering seat will make it difficult to provide other switches, etc. on the panel or the joystick located at the maneuvering seat. Therefore, there is room for improvement in terms of flexibility in the layout of switches.

In addition, when shifting the marine vessel to the autopilot mode or the fixed point holding mode, since the marine vessel operator needs to operate the steering wheel with one hand and operate the automatic maneuvering switch provided on the panel or the joystick, which is spaced away from the steering wheel with the other hand, it is not easy for the marine vessel operator to operate the automatic maneuvering switch accurately. Therefore, there is also room for improvement in terms of operability of the switches.

SUMMARY OF THE INVENTION

Preferred embodiments of the present invention provide marine vessels including steering mechanisms that are each able to not only improve the flexibility in the layout of switches but also improve the operability of the switches.

According to a preferred embodiment of the present invention, a marine vessel includes a steering mechanism including a steering wheel. The steering wheel includes shift switches to cause the marine vessel to shift to a course holding mode to hold a course of the marine vessel, and a traveling direction maintaining mode to maintain a traveling direction maintaining mode to maintain a traveling direction of the marine vessel.

According to another preferred embodiment of the present invention, a marine vessel includes a steering mechanism including a steering wheel. The steering wheel includes shift switches to cause the marine vessel to shift to a position maintaining mode to keep the marine vessel at a predetermined position, a bow direction maintaining mode to maintain a bow direction of the marine vessel in a predetermined direction, and a fixed point holding mode to keep the marine vessel at the predetermined position and maintain the bow direction of the marine vessel in the predetermined direction.

According to another preferred embodiment of the present invention, a marine vessel includes a steering mechanism including a steering wheel. The steering wheel includes a shift switch to cause the marine vessel to shift to at least one of a course holding mode to hold a course of the marine vessel, a traveling direction maintaining mode to maintain a traveling direction of the marine vessel, a position maintaining mode to keep the marine vessel at a predetermined position, a bow direction maintaining mode to maintain a bow direction of the marine vessel in a predetermined direction, or a fixed point holding mode to keep the marine vessel at the predetermined position and maintain the bow direction of the marine vessel in the predetermined direction.

According to preferred embodiments of the present invention, the steering wheel includes the shift switches to cause the marine vessel to shift to the course holding mode, the traveling direction maintaining mode, the position maintaining mode, the bow direction maintaining mode, and the fixed point holding mode. As a result, since there is no need to necessarily provide the shift switches on the panel or the joystick, which is located at the maneuvering seat, it becomes easier to provide other switches on the panel or the joystick, which is located at the maneuvering seat, and the flexibility in the layout of the switches is improved. In addition, since it is possible for the marine vessel operator to operate the shift switches without taking his/her hands off the steering wheel, the operability of the shift switches is also be improved. As a result, it is possible to not only improve the flexibility in the layout of the switches but also improve the operability of the switches.

The above and other elements, features, steps, characteristics and advantages of the present invention will become more apparent from the following detailed description of the preferred embodiments with reference to the attached drawings.

DETAILED DESCRIPTION OF THE
PREFERRED EMBODIMENTS

Hereinafter, preferred embodiments of the present invention will be described with reference to the drawings.

Figure 1:
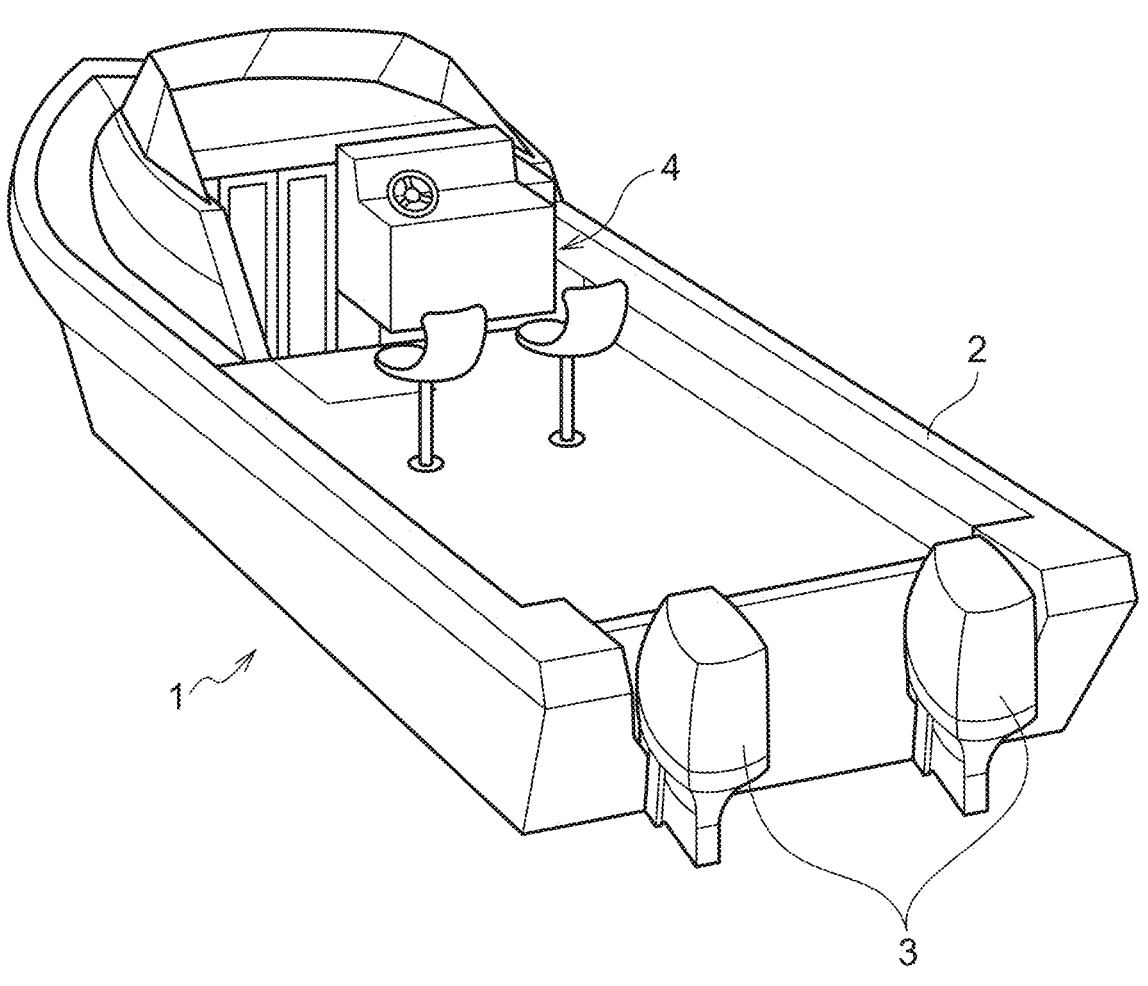
FIG. 1 is a perspective view of a marine vessel equipped with a steering mechanism according to a preferred embodiment of the present invention.

FIG. 1 is a perspective view of a marine vessel including a steering mechanism according to a preferred embodiment of the present invention. A marine vessel 1 includes a hull 2, and a plurality of, for example, two outboard motors 3 that function as marine vessel propulsion devices and are mounted on the hull 2. It should be noted that the number of the outboard motors 3 provided on the marine vessel 1 is not limited to two, and may be one or three or more. The two outboard motors 3 are mounted side by side on the stern of the hull 2. Each outboard motor 3 includes an engine (not shown) which is an internal combustion engine functioning as a power source, and obtains a thrust from a propeller (not shown) which is rotated by a driving force of the corresponding engine. It should be noted that each outboard motor 3 may include an electric motor functioning as the power source, or may include both an engine and an electric motor functioning as the power source.

Figure 2:
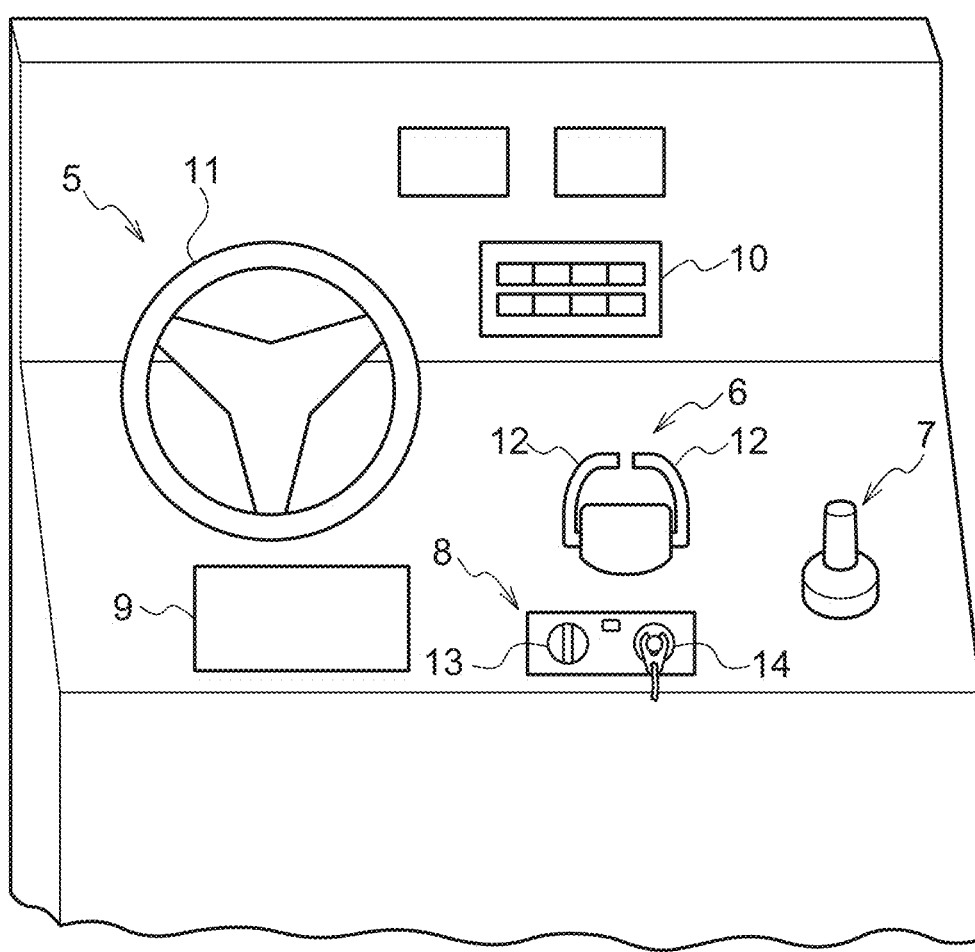
FIG. 2 is a perspective view of a principal portion of a maneuvering seat.

In addition, in the marine vessel 1, a maneuvering seat 4 is provided on the bow side, which is the front portion of the hull 2. FIG. 2 is a perspective view of a principal portion of the maneuvering seat 4. A steering mechanism 5 (hereinafter, also simply referred to as "a marine vessel steering mechanism 5"), a remote control switch 6, a joystick 7, a main operation unit 8, an MFD (Multi Function Display) 9, and an autopilot panel 10 are located on the maneuvering seat 4.

The marine vessel steering mechanism 5 enables a marine vessel operator to determine the course of the marine vessel 1. The marine vessel steering mechanism 5 includes a steering wheel 11 which is rotatably operated. The marine vessel operator is able to turn the marine vessel 1 left or right by rotatably operating the steering wheel 11 left or right. The remote control switch 6 includes levers 12 corresponding to the outboard motors 3, respectively. By operating each lever 12, the marine vessel operator is able to switch a direction of the thrust generated by the corresponding outboard motor 3 between a forward moving direction and a backward moving direction, and adjust the output of the corresponding outboard motor 3 so as to adjust a vessel speed of the marine vessel 1.

The joystick 7 is able to be operated to be tilted forward, backward, leftward, and rightward, and also able to be operated to rotate about an axis. By operating the joystick 7, the marine vessel operator is able to navigate the marine vessel 1 with a course corresponding to a tilting direction of the joystick 7 and a thrust corresponding to a tilting amount of the joystick 7. In a normal mode, the outboard motor 3 works mainly according to an operation of the marine vessel steering mechanism 5 and an operation of the remote control switch 6. On the other hand, in a joystick mode, the outboard motor 3 works mainly according to the operation of the joystick 7. It is possible to switch between the normal mode and the joystick mode by a change-over switch (not shown). In addition, the joystick 7 includes a plurality of shift switches (not shown) that cause the marine vessel 1 to shift to a plurality of fixed point holding modes, respectively. That is, one of the plurality of the shift switches located on the joystick 7 causes the marine vessel 1 to shift to one of the plurality of the fixed point holding modes.

The main operation unit 8 includes a main switch 13 and an emergency switch 14. The main switch 13 (one main switch 13) is provided in common for the outboard motors 3 (respective outboard motors 3). The main switch 13 is an operation piece to collectively start and collectively stop the engines of the outboard motors 3 (the respective outboard motors 3).

The MFD 9 is, for example, a color LCD display. The MFD 9 functions to display various kinds of information, and also functions as a touch panel that accepts inputs from the marine vessel operator. For example, the MFD 9 displays a rotation speed of the engine of each outboard motor 3 and the vessel speed of the marine vessel 1, and accepts settings of the course of the marine vessel 1 in Track Point, which is one of autopilot modes described below.

A plurality of shift switches that cause the marine vessel 1 to shift to a plurality of autopilot modes, respectively, are located on the autopilot panel 10. That is, one of the plurality of the shift switches located on the autopilot panel 10 causes the marine vessel 1 to shift to one of the plurality of the autopilot modes. The marine vessel operator is able to shift the marine vessel 1 to a desired autopilot mode by operating a desired shift switch.

Figure 3:
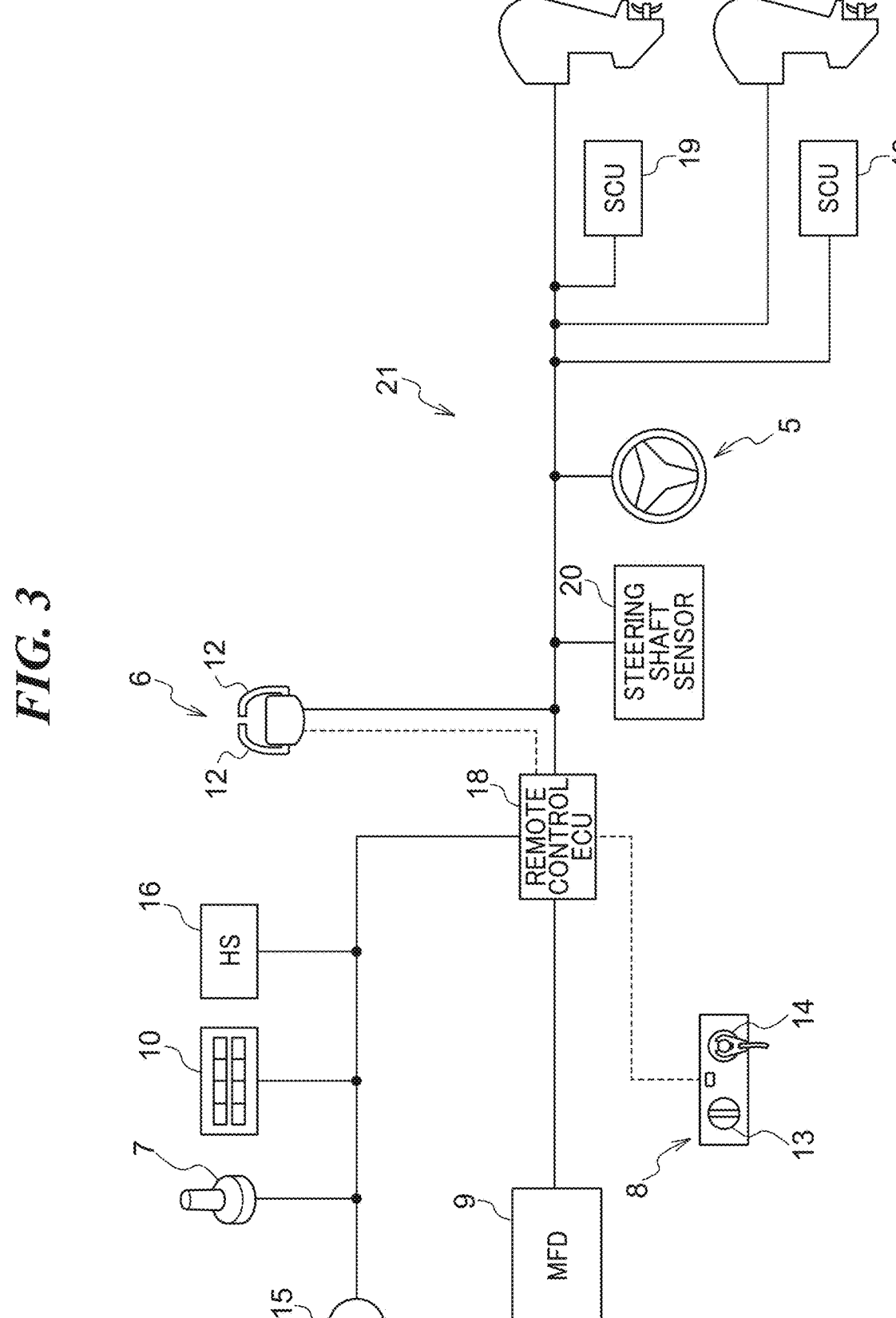
FIG. 3 is a block diagram for schematically explaining a configuration of a marine vessel maneuvering system of the marine vessel of FIG. 1.

FIG. 3 is a block diagram for schematically explaining a configuration of a marine vessel maneuvering system of the marine vessel 1. As shown in FIG. 3, in addition to the outboard motors 3, the marine vessel steering mechanism 5, the remote control switch 6, the joystick 7, the main operation unit 8, the MFD 9, and the autopilot panel 10 that are described above, the marine vessel maneuvering system of the marine vessel 1 includes a GPS (Global Positioning System) 15, an HS (Heading Sensor) 16, a remote control ECU (Engine Control Unit) 18 functioning as a controller, SCUs (Steering Control Units) 19, and a steering shaft sensor 20.

The GPS 15 obtains the current position of the marine vessel 1 and transmits the current position of the marine vessel 1 to the remote control ECU 18 as position information. The HS 16 incorporates direction sensors (azimuth sensors) such as a yaw sensor, a roll sensor, and a pitch sensor, an acceleration sensor that measures an acceleration of the marine vessel 1 in a front-rear direction (a longitudinal direction), an acceleration sensor that measures an acceleration of the marine vessel 1 in a left/right direction, and an acceleration sensor that measures an acceleration of the marine vessel 1 in a vertical direction. The HS 16 transmits a direction of the marine vessel 1 and the respective accelerations (movement) of the marine vessel 1 to the remote control ECU 18.

The remote control ECU 18 is a main controller of the marine vessel maneuvering system, and controls operations of respective components of the marine vessel maneuvering system according to digital signals that will be described below, and various kinds of programs. In addition, the remote control ECU 18 controls the engine of each outboard motor 3 according to the operation of each lever 12 of the remote control switch 6. The SCU 19 is provided corresponding to each outboard motor 3, and controls a steering unit that horizontally turns the corresponding outboard motor 3 with respect to the hull 2 of the marine vessel 1 so as to change an acting direction of the thrust of each outboard motor 3. The steering shaft sensor 20 detects a rotation angle (an operation angle) of the steering wheel 11 of the marine vessel steering mechanism 5.

In the marine vessel maneuvering system, the respective components are connected to each other by a CAN (Control Area Network) 21 that is a network in which a plurality of nodes are individually connected to a bus. In the CAN 21, operation inputs to the respective components are transmitted as the digital signals to the remote control ECU 18 via the bus.

In addition, in the marine vessel maneuvering system, the remote control switch 6 is connected to the remote control ECU 18 not only by the CAN 21 but also by individual wiring (see a broken line in FIG. 3), and the main operation unit 8 is connected to the remote control ECU 18 not by the CAN 21 but by individual wiring (see a broken line in FIG. 3). The operation input to each lever 12 of the remote control switch 6 is transmitted also as an analog signal to the remote control ECU 18, and the operation input to the main switch 13 of the main operation unit 8 and the operation input to the emergency switch 14 of the main operation unit 8 are also transmitted as analog signals to the remote control ECU 18.

It should be noted that in the marine vessel maneuvering system, the respective components may be connected to each other not by the CAN but by a LAN (Local Area Network) such as Ethernet (registered trademark) that performs connecting via a network device, or the respective components may be directly connected to each other. Also in this case, the operation inputs to the respective components are transmitted as the digital signals to the remote control ECU 18.

Figure 4:
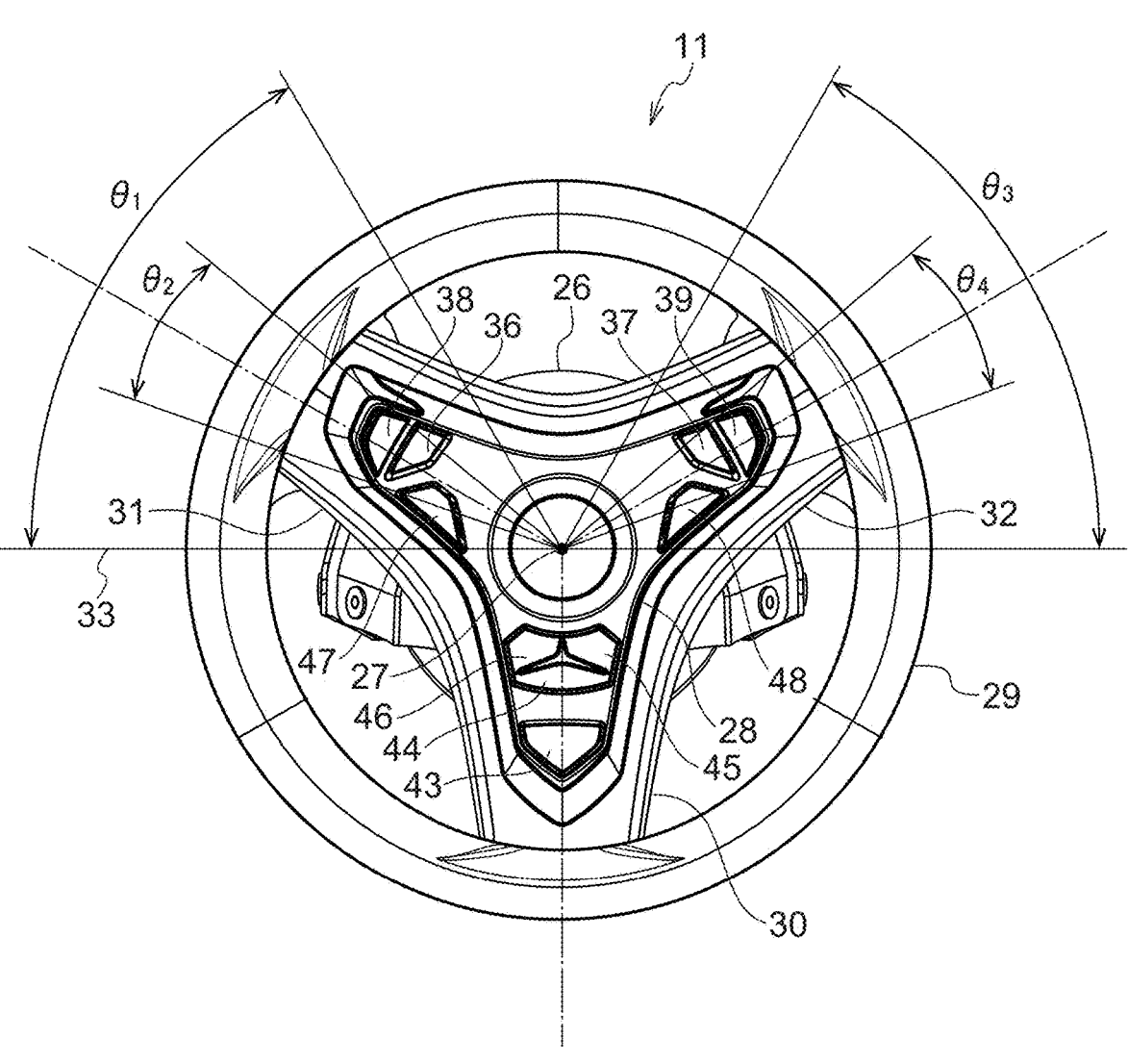
FIG. 4 is a view for explaining a configuration of the steering mechanism.

FIG. 4 is a view for explaining a configuration of the marine vessel steering mechanism 5. FIG. 4 shows a case that the marine vessel steering mechanism 5 is viewed from the side of the marine vessel operator. It should be noted that a vertical direction and a left/right direction of FIG. 4 correspond to the vertical direction and the left/right direction of the marine vessel 1, the depth side of FIG. 4 is the bow side of the marine vessel 1, and the front side of FIG. 4 is the stern side of the marine vessel 1.

As shown in FIG. 4, the marine vessel steering mechanism 5 includes the steering wheel 11, and a column portion 26 that pivotally and rotatably supports the steering wheel 11. The steering wheel 11 includes a central portion 28 that is supported rotatably around a rotation fulcrum (a steering shaft) 27 with respect to the column portion 26, a wheel portion 29 that has an annular shape, and for example, three spoke portions (spoke portions 30, 31, and 32) that connect the central portion 28 and the wheel portion 29.

When the steering wheel 11 is at a position that makes the marine vessel 1 move straight, the spoke portion 30 is positioned below a virtual plane 33 passing through the rotation fulcrum 27 and parallel to the left/right direction, and extends downward from the rotation fulcrum 27.

Further, when the steering wheel 11 is at the position that makes the marine vessel 1 move straight, the spoke portion 31 is positioned above the virtual plane 33, and extends from the rotation fulcrum 27 so as to be positioned within an angle range from about 0° to about 60° clockwise with respect to the virtual plane 33 in a circumferential direction about the rotation fulcrum 27 (within an angle range indicated by θ1 in FIG. 4), preferably, so as to be positioned within an angle range from about 20° to about 40° clockwise with respect to the virtual plane 33 in the circumferential direction about the rotation fulcrum 27 (within an angle range indicated by θ2 in FIG. 4).

Furthermore, when the steering wheel 11 is at the position that makes the marine vessel 1 move straight, the spoke portion 32 is positioned above the virtual plane 33, and extends from the rotation fulcrum 27 so as to be positioned within an angle range from about 0° to about 60° counterclockwise with respect to the virtual plane 33 in the circumferential direction about the rotation fulcrum 27 (within an angle range indicated by θ3 in FIG. 4), preferably, so as to be positioned within an angle range from about 20° to about 40° counterclockwise with respect to the virtual plane 33 in the circumferential direction about the rotation fulcrum 27 (within an angle range indicated by θ4 in FIG. 4).

In a preferred embodiment of the present invention, there are a plurality of autopilot modes and a plurality of fixed point holding modes, to which the marine vessel 1 is able to shift. For example, the marine vessel 1 is able to shift to Course Hold (a course holding mode) which is one of the plurality of the autopilot modes, or Heading Hold (a traveling direction maintaining mode) which is one of the plurality of the autopilot modes. Furthermore, the marine vessel 1 is able to shift to Fish Point™ (a position maintaining mode) which is one of the plurality of the fixed point holding modes, Drift Point™ (a bow direction maintaining mode) which is one of the plurality of the fixed point holding modes, or Stay Point™ which is one of the plurality of the fixed point holding modes. It should be noted that Fish Point™, Drift Point™, and Stay Point™ are all registered trademarks.

Figure 5A:
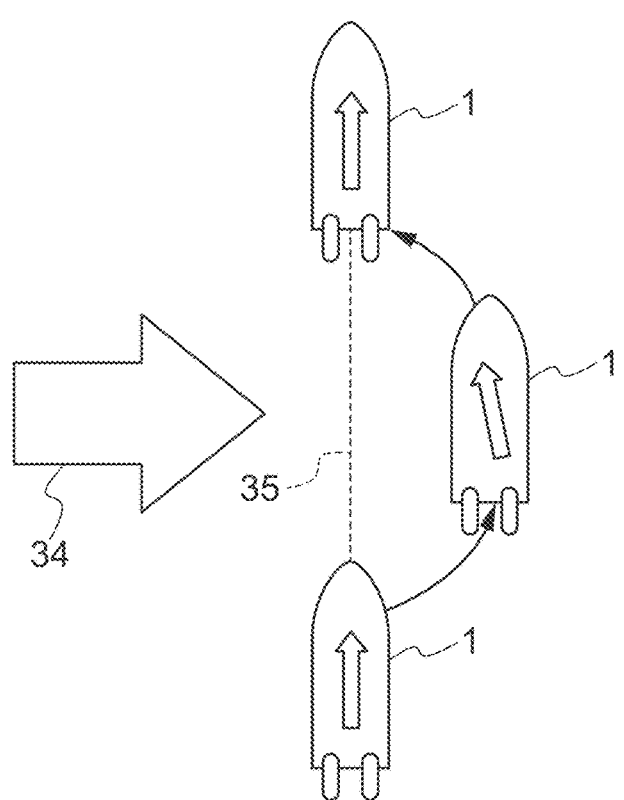
FIG. 5A is a view for explaining Course Hold which is one of autopilot modes.
Figure 5B:
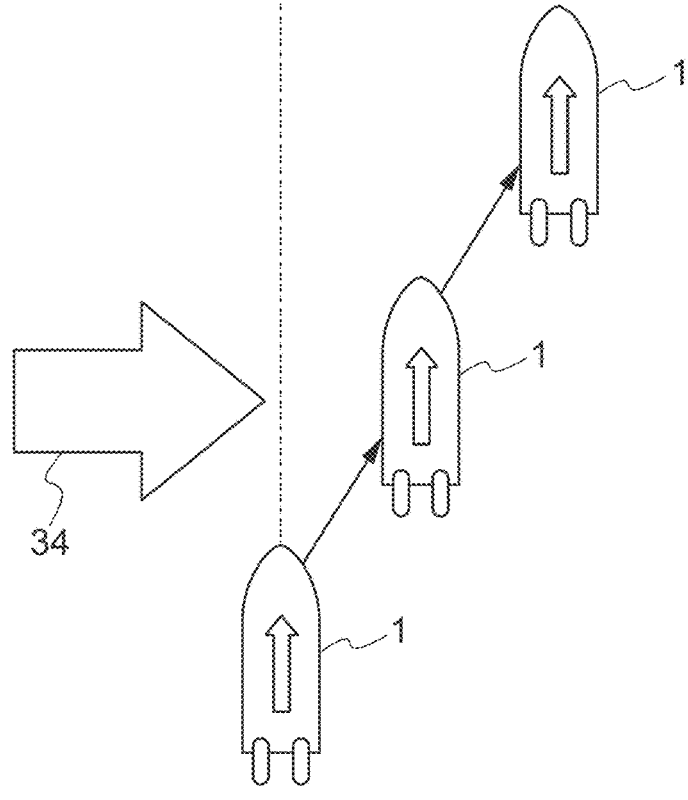
FIG. 5B is a view for explaining Heading Hold which is one of the autopilot modes.

As shown in FIG. 5A, in the Course Hold which is an autopilot mode, when the marine vessel 1 navigates, the thrust of each outboard motor 3 and the acting direction of the thrust of each outboard motor 3 are controlled so that the marine vessel 1 follows a set course 35 even when subjected to external disturbances 34 such as wind and water currents. It should be noted that in FIGS. 5A, 5B, 6A to 6C, 7, 8A, and 8B, an arrow included in the marine vessel 1 indicates the acting direction of the thrust. Furthermore, as shown in FIG. 5B, in the Heading Hold which is an autopilot mode, when the marine vessel 1 navigates, the thrust of each outboard motor 3 and the acting direction of the thrust of each outboard motor 3 are controlled so that the marine vessel 1 maintains a set heading (a set bow direction) even when subjected to the external disturbances 34 such as the wind and the water currents.

Figure 6A:
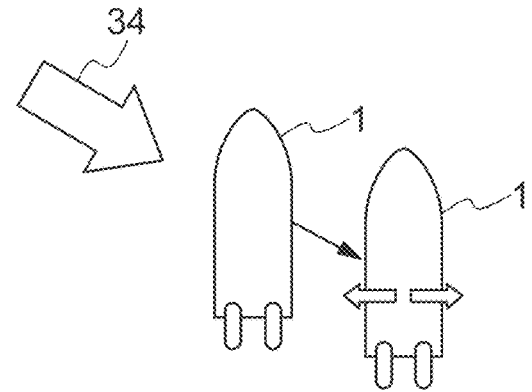
FIG. 6A is a view for explaining Drift Point™ which is one of fixed point holding modes.
Figure 6B:
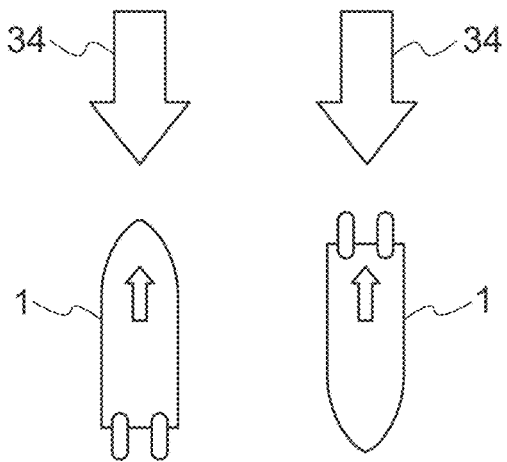
FIG. 6B is a view for explaining Fish Point™ which is one of the fixed point holding modes.
Figure 6C:
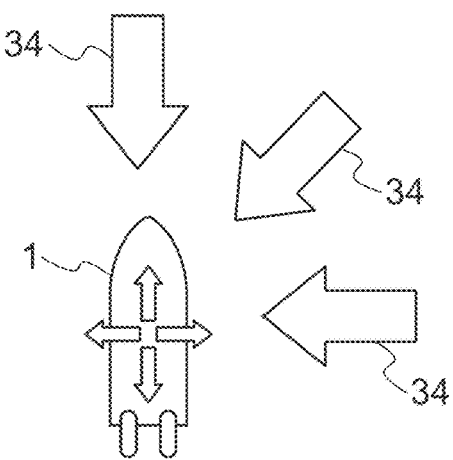
FIG. 6C is a view for explaining Stay Point™ which is one of the fixed point holding modes.

As shown in FIG. 6A, in the Drift Point™ which is a fixed point holding mode, when the marine vessel 1 is stopped, the thrust of each outboard motor 3 and the acting direction of the thrust of each outboard motor 3 are controlled so that the marine vessel 1 maintains the set heading (the set bow direction) even when subjected to the external disturbances 34 such as the wind and the water currents. It should be noted that in the Drift Point™, the movement of the marine vessel 1 is not actively restricted and the movement of the marine vessel 1 due to the external disturbances 34 is allowed. Furthermore, as shown in FIG. 6B, in the Fish Point™ which is a fixed point holding mode, in the case that the marine vessel 1 is stopped, when the marine vessel 1 is subjected to the external disturbances 34 such as the wind and the water currents, the thrust of each outboard motor 3 and the acting direction of the thrust of each outboard motor 3 are controlled so that the bow or the stern of the marine vessel 1 is opposed to the flow of the wind and the water currents and the marine vessel 1 stays at one point (one spot). Moreover, as shown in FIG. 6C, in the Stay Point™ which is a fixed point holding mode, when the marine vessel 1 is stopped, the thrust of each outboard motor 3 and the acting direction of the thrust of each outboard motor 3 are controlled so that the marine vessel 1 maintains the set heading (the set bow direction) and the marine vessel 1 stays at one point (one spot) even when subjected to the external disturbances 34 such as the wind and the water currents.

In a preferred embodiment of the present invention, shift switches that cause the marine vessel 1 to shift to the autopilot modes described above and the fixed point holding modes described above, respectively, are located on the steering wheel 11.

Returning to FIG. 4, the spoke portion 31 of the steering wheel 11 is provided with a heading hold switch 36 (the shift switch) that causes the marine vessel 1 to shift to the Heading Hold. In addition, the spoke portion 32 of the steering wheel 11 is provided with a course hold switch 37 (the shift switch) that causes the marine vessel 1 to shift to the Course Hold. In particular, it is preferable that the heading hold switch 36 and the course hold switch 37 are located within a range that fingers of the marine vessel operator who is gripping the wheel portion 29, for example, thumbs, can reach. It should be noted that the heading hold switch 36 may be located on the spoke portion 32 and the course hold switch 37 may be located on the spoke portion 31.

In the marine vessel 1 that is navigating, sometimes the marine vessel operator grips the wheel portion 29 while standing, at that time, since the marine vessel operator holds the wheel portion 29 from above, the marine vessel operator grips the upper half of the wheel portion 29, particularly grips the vicinity where the wheel portion 29 intersects the spoke portions 31 and 32. Therefore, in the case that the heading hold switch 36 and the course hold switch 37 are located within the range that the thumbs of the marine vessel operator who is gripping the wheel portion 29 can reach, since the marine vessel operator is able to operate the heading hold switch 36 and the course hold switch 37 with his or her thumbs without regripping the wheel portion 29, the operability of the heading hold switch 36 and the course hold switch 37 is improved.

When the heading hold switch 36 or the course hold switch 37 is operated, specifically, when the heading hold switch 36 or the course hold switch 37 is pressed down, in the CAN 21, the operation input to the heading hold switch 36 or the course hold switch 37 operated (pressed down) is transmitted as the digital signal to the remote control ECU 18. In order to realize the Course Hold or the Heading hold, the remote control ECU 18 transmits control signals to each SCU 19 and an ECU (Engine Control Unit) (not shown) of each outboard motor 3 to control the thrust of each outboard motor 3 and the acting direction of the thrust of each outboard motor 3. After the marine vessel 1 shifts to the autopilot mode, when the marine vessel operator operates the heading hold switch 36 or the course hold switch 37 again, or rotates the wheel portion 29 by a predetermined amount or more, the autopilot mode is released.

Furthermore, in the case of shifting the marine vessel 1 to the Heading hold or the Course Hold, although the marine vessel 1 is often navigating at a high speed, for example, at about 50 knots, in a preferred embodiment of the present invention, it is possible for the marine vessel operator to operate the heading hold switch 36 or the course hold switch 37 without taking his/her hands off the wheel portion 29. Therefore, when the marine vessel operator shifts the marine vessel 1 to the autopilot mode, the marine vessel operator is able to keep holding the wheel portion 29 of the marine vessel 1 navigating at the high speed, and as a result, it is possible to easily maintain the course of the marine vessel 1.

Figure 7:
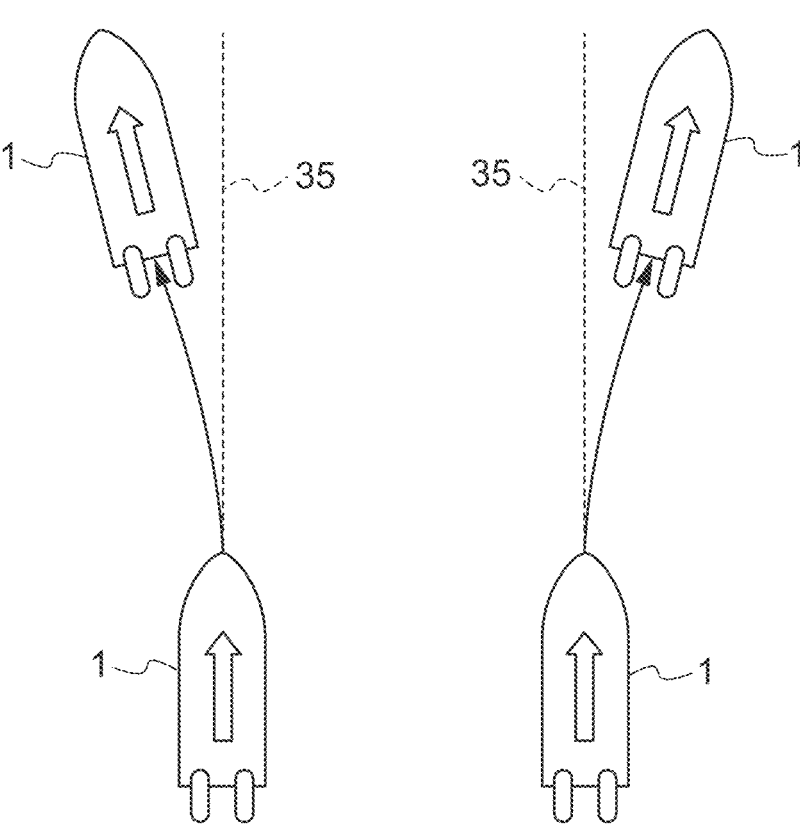
FIG. 7 is a view for explaining a fine adjustment of the course of the marine vessel in the autopilot mode.

In addition, in a preferred embodiment of the present invention, it is possible to perform a fine adjustment of the course of the marine vessel 1 in the autopilot mode. As shown in FIG. 7, with respect to the set course 35, it is possible to slightly change the course of the marine vessel 1 toward the starboard direction or the port direction. In order to change the course of the marine vessel 1, when the wheel portion 29 is rotated, as described above, since there is a possibility that the autopilot mode will be released, in a preferred embodiment of the present invention, the fine adjustment of the course of the marine vessel 1 is performed with switches. These switches are located on the steering wheel 11. Specifically, in the spoke portion 31, within the range that the fingers of the marine vessel operator who is gripping the wheel portion 29 can reach, a heading changing switch 38 (a course adjusting switch) that finely adjusts the course of the marine vessel 1 toward the port direction is located so as to be adjacent to the heading hold switch 36. Further, in the spoke portion 32, within the range that the fingers of the marine vessel operator who is gripping the wheel portion 29 can reach, a heading changing switch 39 (a course adjusting switch) that finely adjusts the course of the marine vessel 1 toward the starboard direction is located so as to be adjacent to the course hold switch 37. It should be noted that in the spoke portion 31, the heading changing switch 38 may be located on a range other than the range that the fingers of the marine vessel operator who is gripping the wheel portion 29 can reach. Also, it should be noted that in the spoke portion 32, the heading changing switch 39 may be located on a range other than the range that the fingers of the marine vessel operator who is gripping the wheel portion 29 can reach.

When the heading changing switch 38 or the heading changing switch 39 is operated, specifically, when the heading changing switch 38 or the heading changing switch 39 is pressed down, in the CAN 21, the operation input to the heading changing switch 38 or the heading changing switch 39 operated (pressed down) is transmitted as the digital signal to the remote control ECU 18. In order to slightly change the course of the marine vessel 1, the remote control ECU 18 transmits control signals to each SCU 19 and the ECU (not shown) of each outboard motor 3 to control the thrust of each outboard motor 3 and the acting direction of the thrust of each outboard motor 3. It should be noted that the remote control ECU 18 changes a change amount of the course of the marine vessel 1 according to the number of times of operations of the heading changing switch 38 or the heading changing switch 39. Specifically, as the number of times of the operations of the heading changing switch 38 increases, the change amount of the course of the marine vessel 1 toward the port direction is increased. In addition, as the number of times of the operations of the heading changing switch 39 increases, the change amount of the course of the marine vessel 1 toward the starboard direction is increased.

Since the heading changing switch 38 and the heading changing switch 39 are located adjacent to the heading hold switch 36 and the course hold switch 37, respectively, the marine vessel operator is able to operate the heading changing switch 38 and the heading changing switch 39 without regripping the wheel portion 29, and as a result, the operability of the heading changing switch 38 and the heading changing switch 39 is improved. In particular, in the marine vessel 1 that has shifted to the autopilot mode and is navigating at the high speed, since the marine vessel operator is able to change the course of the marine vessel 1 without taking his/her hands off the wheel portion 29, it is possible to further enhance the operability of the heading changing switch 38 and the heading changing switch 39.

In addition, since the heading changing switch 38 which finely adjusts the course of the marine vessel 1 toward the port direction is located on the spoke portion 31 which is located on the port side when the steering wheel 11 is at the position that makes the marine vessel 1 move straight, and the heading changing switch 39 which finely adjusts the course of the marine vessel 1 toward the starboard direction is located on the spoke portion 32 which is located on the starboard side when the steering wheel 11 is at the position that makes the marine vessel 1 move straight, when the marine vessel operator wants to slightly change the course of the marine vessel 1 toward a desired direction, the marine vessel operator just needs to operate the heading changing switch for the desired direction. Therefore, the marine vessel operator is able to intuitively navigate the marine vessel 1 by using the heading changing switch, and as a result, the burden on the marine vessel operator is reduced.

Figure 8A:
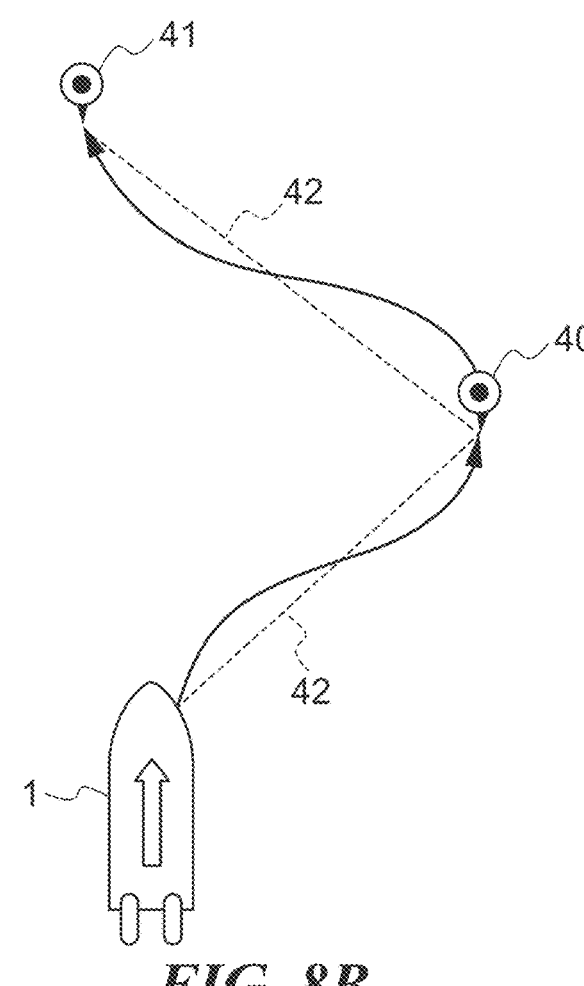
FIG. 8A is a view for explaining Track Point which is one of the autopilot modes.
Figure 8B:
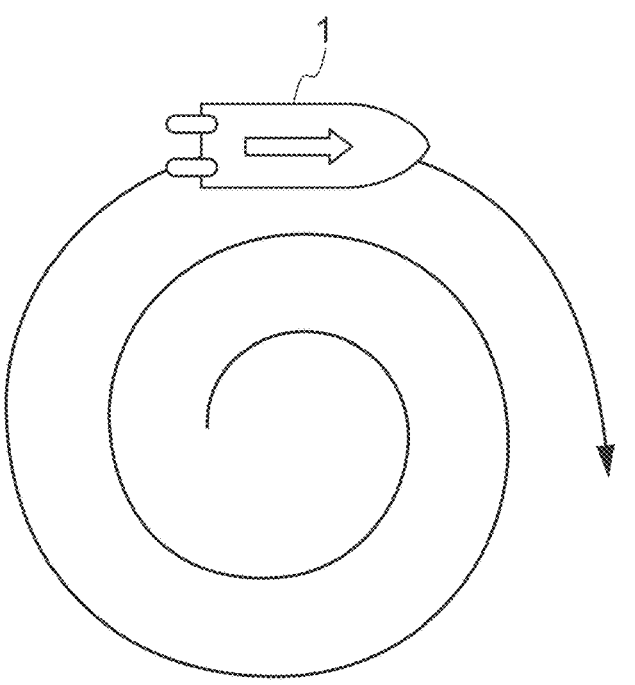
FIG. 8B is a view for explaining Pattern Steer which is one of the autopilot modes.

In addition, in a preferred embodiment of the present invention, as the autopilot modes, the marine vessel 1 can shift not only to the Course Hold and the Heading Hold, but also, for example, to the Track Point and Pattern Steer. As shown in FIG. 8A, in the Track Point, a course 42 is set to pass through waypoints 40 and 41, which are set in advance by the marine vessel operator, for example, in the MFD 9, and the thrust of each outboard motor 3 and the acting direction of the thrust of each outboard motor 3 are controlled so that the marine vessel 1 navigates along the course 42. Furthermore, as shown in FIG. 8B, in the Pattern Steer, the thrust of each outboard motor 3 and the acting direction of the thrust of each outboard motor 3 are controlled so that the marine vessel 1 navigates according to a navigating pattern, which is set in advance by the marine vessel operator, for example, in the MFD 9. In FIG. 8B, although a spiral pattern that continues spiral movement is set as the navigating pattern, a zigzag pattern that continues zigzag movement can also be set as the navigating pattern.

Although there are no dedicated switches which cause the marine vessel 1 to shift to the Track Point and the Pattern Steer, respectively, on the steering wheel 11, as described above, since the heading hold switch 36 and the course hold switch 37 transmit the digital signals according to the operation inputs to the heading hold switch 36 and the course hold switch 37, it is possible to assign shifting to the Track Point and shifting to the Pattern Steer to these digital signals. Accordingly, by operating the heading hold switch 36 or the course hold switch 37, it is possible to shift the marine vessel 1 to the Track Point or the Pattern Steer. For example, in the MFD 9, the marine vessel operator is able to change assigning of functions to the digital signals transmitted by the heading hold switch 36 and the course hold switch 37.

Also, the functions of the heading hold switch 36 and the course hold switch 37 may be switched according to the operation of a switch 43 located on the spoke portion 30 of the steering wheel 11. Specifically, each time the switch 43 is operated, the function of the heading hold switch 36 may be switched between shifting to the Heading Hold and shifting to the Track Point. In addition, each time the switch 43 is operated, the function of the course hold switch 37 may be switched between shifting to the Course Hold and shifting to the Pattern Steer.

It should be noted that since the course of the marine vessel 1 is changed in the Track Point and the Pattern Steer, it is preferable to avoid shifting to the Track Point due to carelessness of the marine vessel operator and shifting to the Pattern Steer due to carelessness of the marine vessel operator. In response to this, it is preferable so that the marine vessel 1 does not shift to the Track Point or the Pattern Steer unless the heading hold switch 36 or the course hold switch 37 is operated (is pressed down) for a predetermined period of time or longer.

In addition, a fish point switch 44 (the shift switch) that causes the marine vessel 1 to shift to the Fish Point™, a stay point switch 45 (the shift switch) that causes the marine vessel 1 to shift to the Stay Point™, and a drift point switch 46 (the shift switch) that causes the marine vessel 1 to shift to the Drift Point™ are located on the spoke portion 30 of the steering wheel 11.

When the fish point switch 44, the stay point switch 45, or the drift point switch 46 is operated, specifically, when the fish point switch 44, the stay point switch 45, or the drift point switch 46 is pressed down, in the CAN 21, the operation input to the fish point switch 44, the stay point switch 45, or the drift point switch 46 is transmitted as the digital signal to the remote control ECU 18. In order to realize the Fish Point, the Stay Point™, or the Drift Point™, the remote control ECU 18 transmits control signals to each SCU 19 and the ECU of each outboard motor 3 to control the thrust of each outboard motor 3 and the acting direction of the thrust of each outboard motor 3.

Operations of the fish point switch 44, the stay point switch 45, and the drift point switch 46 are disabled unless in a state that each lever 12 of the remote control switch 6 is positioned at N (neutral) and the engine of each outboard motor 3 is disconnected from the propeller by a clutch or the like.

After the marine vessel 1 shifts to the fixed point holding mode, when the marine vessel operator operates the fish point switch 44, the stay point switch 45, or the drift point switch 46 again, or moves the position of each lever 12 of the remote control switch 6 from N (neutral) to another position, the fixed point holding mode is released.

As described above, in the marine vessel 1 that is navigating, since the marine vessel operator grips the vicinity where the wheel portion 29 intersects the spoke portions 31 and 32, the fingers of the marine vessel operator cannot reach the spoke portion 30 extending downward from the rotation fulcrum 27. Therefore, when the marine vessel 1 is navigating, the marine vessel operator will not erroneously operate the fish point switch 44, the stay point switch 45, and the drift point switch 46 which are assumed to be operated when the marine vessel 1 is navigating at a low speed or when the marine vessel 1 is stopped. In addition, since the fish point switch 44, the stay point switch 45, and the drift point switch 46 are located at places where it is difficult to operate when the marine vessel 1 is navigating, the marine vessel operator is able to intuitively understand that these switches are assumed to be operated when the marine vessel 1 is navigating at the low speed or when the marine vessel 1 is stopped.

In addition, in a preferred embodiment of the present invention, it is possible to set a level of the thrust of each outboard motor 3 to adjust the position of the marine vessel 1 in the fixed point holding mode, for example, it is possible to set the level of the thrust generated by each outboard motor 3 in order to keep the marine vessel 1 at one point in the Fish Point™. In a preferred embodiment of the present invention, the level of the thrust is set with two switches. These two switches are also located on the steering wheel 11. Specifically, a thrust level setting switch 47, which decreases the level of the thrust, is located on the spoke portion 31, and a thrust level setting switch 48, which increases the level of the thrust, is located on the spoke portion 32.

When the thrust level setting switch 47 or the thrust level setting switch 48 is operated, specifically, when the thrust level setting switch 47 or the thrust level setting switch 48 is pressed down, in the CAN 21, the operation input to the thrust level setting switch 47 or the thrust level setting switch 48 is transmitted as the digital signal to the remote control ECU 18. The remote control ECU 18 changes the level of the thrust of each outboard motor 3 generated in the fixed point holding mode. It should be noted that the remote control ECU 18 changes the level of the thrust according to the number of times of operations of the thrust level setting switch 47 or the thrust level setting switch 48. Specifically, as the number of times of the operations of the thrust level setting switch 48 increases, the level of the thrust generated in the fixed point holding mode is increased. In addition, as the number of times of the operations of the thrust level setting switch 47 increases, the level of the thrust generated in the fixed point holding mode is decreased.

According to a preferred embodiment of the present invention, the shift switches 36, 37, 44, 45, and 46 that cause the marine vessel 1 to shift to the autopilot modes and the fixed point holding modes, respectively, are located on the steering wheel 11. This eliminates the need for the marine vessel operator to operate the automatic maneuvering switch provided on the panel or the joystick, which is spaced away from the steering wheel 11, in order to shift the marine vessel 1 to the autopilot mode or the fixed point holding mode. In particular, since the heading hold switch 36 and the course hold switch 37 are located within the range that the fingers of the marine vessel operator who is gripping the wheel portion 29 can reach, the marine vessel operator is able to shift the marine vessel 1 to the autopilot mode without taking his/her hands off the wheel portion 29 of the steering wheel 11. As a result, it is possible to improve the operability of the shift switches 36, 37, 44, 45, and 46.

Furthermore, when the marine vessel 1 is navigating, although the steering wheel 11 often comes into the field of view of the marine vessel operator, in a preferred embodiment of the present invention, since the shift switches 36, 37, 44, 45, and 46 are located on the steering wheel 11, it is also possible to improve the visibility of the shift switches 36, 37, 44, 45, and 46.

Moreover, in a preferred embodiment of the present invention, since the shift switches that cause the marine vessel 1 to shift to the autopilot modes and the fixed point holding modes, respectively, do not necessarily have to be located on the panel or the joystick, which is located at the maneuvering seat 4, it is possible to provide other switches on the panel or the joystick, which is located at the maneuvering seat 4, and as a result, it is possible to improve the flexibility in the layout of the other switches. In addition, in a preferred embodiment of the present invention, the marine vessel maneuvering system of FIG. 3 can be provided on the marine vessel 1 only by providing the marine vessel steering mechanism 5 including the steering wheel 11 on the marine vessel 1 without providing the shift switches 36, 37, 44, 45, and 46 on the panel or the joystick, which is located at the maneuvering seat 4, and it is possible to easily realize the autopilot modes and the fixed point holding modes.

Although preferred embodiments of the present invention have been described above, the present invention is not limited to the above-described preferred embodiments, and various modifications and changes can be made within the scope of the gist thereof.

For example, the locations of the shift switches 36, 37, 44, 45, and 46 are not limited to the spoke portions 30, 31, and 32, as an example, at least one of the shift switches 36, 37, 44, 45, and 46 may be located on the column portion 26, the central portion 28, or the wheel portion 29. Similarly, locations of the heading changing switches 38 and 39, and the thrust level setting switches 47 and 48 may be the column portion 26, the central portion 28, or the wheel portion 29.

Further, each of the shift switches 36, 37, 44, 45, and 46 may be provided with an indicator indicating that the marine vessel 1 has shifted to the corresponding mode according to the operation input. For example, each of the shift switches 36, 37, 44, 45, and 46 is provided with a small lighting unit (for example, an LED lamp), and when each of the shift switches 36, 37, 44, 45, and 46 is operated and the marine vessel 1 shifts to the corresponding mode, the lighting unit lights up. Alternatively, each of the shift switches 36, 37, 44, 45, and 46 is provided with a backlight unit, and when each of the shift switches 36, 37, 44, 45, and 46 is operated and the marine vessel 1 shifts to the corresponding mode, light emitted from the backlight unit is transmitted through a printed portion (for example, a character string "STAY POINT") of the shift switches 36, 37, 44, 45, and 46, and the printed portion emits light. This allows the marine vessel operator to easily understand whether or not the marine vessel 1 has shifted to a desired mode.

It should be noted that regardless of whether or not the shift switch is operated, the printed portion of each of the shift switches 36, 37, 44, 45, and 46 may be illuminated by the backlight unit. In this case, it is possible to improve the visibility of the shift switches 36, 37, 44, 45, and 46 in the marine vessel 1 navigating at dusk or at night.

Figure 9:
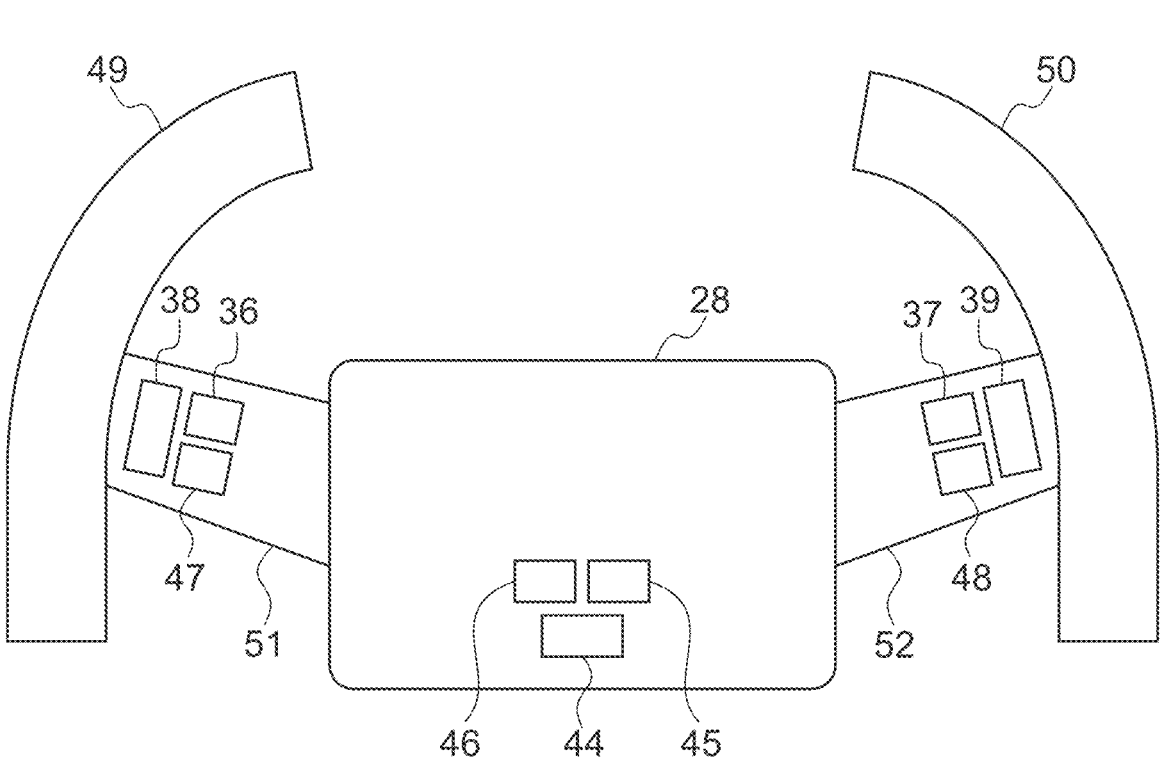
FIG. 9 is a view for explaining a configuration of a modified example of a steering wheel included in a steering mechanism.

Furthermore, as shown in FIG. 9, instead of the wheel portion 29 having an annular shape, the steering wheel 11 on which the shift switches 36, 37, 44, 45, and 46 are located may be provided with handlebars 49 and 50 that are located on the right and the left, respectively. In this case, the heading hold switch 36, the heading changing switch 38, and the thrust level setting switch 47 are located on a spoke portion 51 that connects the handlebar 49 located on the port side and the central portion 28, and the course hold switch 37, the heading changing switch 39, and the thrust level setting switch 48 are located on a spoke portion 52 that connects the handlebar 50 located on the starboard side and the central portion 28.

In addition, since the shift switches 36, 37, 44, 45, and 46, the heading changing switches 38 and 39, and the thrust level setting switches 47 and 48 transmit the digital signals according to the operation inputs to the shift switches 36, 37, 44, 45, and 46, the heading changing switches 38 and 39, and the thrust level setting switches 47 and 48, it is possible to assign respective switches to functions other than the functions described above by associating the digital signals with other functions. For example, it is possible to assign a lateral movement mode toward the port direction to the heading changing switch 38 and assign a lateral movement mode toward the starboard direction to the heading changing switch 39. In addition, it is possible to assign a dock hold mode toward the port direction to the heading hold switch 36 and assign a dock hold mode toward the starboard direction to the course hold switch 37. It should be noted that the marine vessel operator is able to assign other functions to respective switches by using, for example, the MFD 9.

Figure 10:
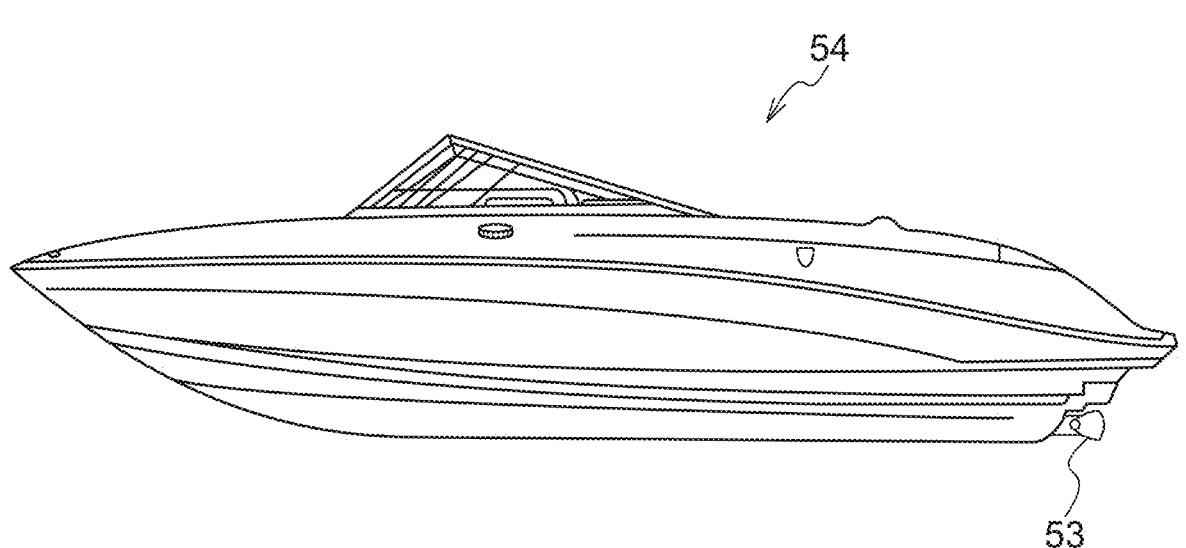
FIG. 10 is a side view of a modified example of a marine vessel including a steering mechanism according to a preferred embodiment of the present invention.

Although the marine vessel steering mechanism 5 according to preferred embodiments of the present invention is applied to the marine vessel 1 including the two outboard motors 3, there is no limitation on the type of the marine vessel to which the marine vessel steering mechanism 5 is applied, and it may be applied to a marine vessel including inboard/outboard motors or inboard motors, and for example, as shown in FIG. 10, it may be applied to a jet boat 54, which is a marine vessel that has at least one of an engine or an electric motor built into its hull and navigates by the thrust of a water jet 53.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel comprising:

a steering mechanism including a steering wheel; wherein the steering wheel includes shift switches to cause the marine vessel to shift to a course holding mode to hold a course of the marine vessel, and a traveling direction maintaining mode to maintain a traveling direction of the marine vessel;

the steering wheel further includes course adjusting switches to adjust the course of the marine vessel navigating in the course holding mode or the traveling direction maintaining mode;

the course adjusting switches include first and second course adjusting switches corresponding to starboard and port of the marine vessel;

the first course adjusting switch to change the course toward the starboard is located on a starboard side of the steering wheel when the marine vessel is moving straight; a the second course adjusting switch to change the course toward the port is located on a port side of the steering wheel when the marine vessel is moving straight; and when a marine vessel operator rotates a wheel portion of the steering wheel by a predetermined amount or more, the course holding mode or the traveling direction maintaining mode is released.

2. The marine vessel according to claim 1, wherein the shift switches are located within reach of fingers of a marine vessel operator who is gripping the wheel portion of the steering wheel.

3. The marine vessel according to claim 1, wherein each of the shift switches is operable to emit a digital signal to a controller configured or programmed to control at least one of propulsion devices or steering units of the marine vessel according to an operation on the shift switches.

4. The marine vessel according to claim 1, wherein the steering wheel includes a central portion supported rotatably around a rotation fulcrum with respect to a hull of the marine vessel, the wheel portion, and spoke portions that connect the central portion and the wheel portion; and the shift switches are located on the spoke portions.

5. The marine vessel according to claim 4, wherein the spoke portions including the shift switches are positioned above a virtual plane passing through the rotation fulcrum and parallel to a left/right direction of the marine vessel, and are positioned within an angle range from about 0° to about 60° with respect to the virtual plane in a circumferential direction about the rotation fulcrum.

6. A marine vessel comprising:

a steering mechanism including a steering wheel; and the steering wheel includes shift switches to cause the marine vessel to shift to a position maintaining mode to keep the marine vessel at a predetermined position, a bow direction maintaining mode to maintain a bow direction of the marine vessel in a predetermined direction, and a fixed point holding mode to keep the marine vessel at the predetermined position and maintain the bow direction of the marine vessel in the predetermined direction.

7. The marine vessel according to claim 6, wherein each of the shift switches is operable to emit a digital signal to a controller configured or programmed to control at least one of propulsion devices or steering units of the marine vessel.

8. The marine vessel according to claim 6, wherein the steering wheel further includes thrust level setting switches to set a thrust level to adjust a position of the marine vessel in the position maintaining mode, the bow direction maintaining mode, or the fixed point holding mode.

9. The marine vessel according to claim 6, wherein the steering wheel includes a central portion supported rotatably around a rotation fulcrum with respect to a hull of the marine vessel, an annular wheel portion, and a spoke portion that connects the central portion and the wheel portion; and the shift switches are located on the spoke portion.

10. The marine vessel according to claim 9, wherein the spoke portion including the shift switches is positioned below a virtual plane passing through the rotation fulcrum and parallel to a left/right direction of the marine vessel.

11. A marine vessel comprising:

a steering mechanism including a steering wheel; wherein the steering wheel includes a shift switch to cause the marine vessel to shift to at least one of a course holding mode to hold a course of the marine vessel, a traveling direction maintaining mode to maintain a traveling direction of the marine vessel, a position maintaining mode to keep the marine vessel at a predetermined position, a bow direction maintaining mode to maintain a bow direction of the marine vessel in a predetermined direction, or a fixed point holding mode to keep the marine vessel at the predetermined position and maintain the bow direction of the marine vessel in the predetermined direction;

the steering wheel further includes course adjusting switches to adjust the course of the marine vessel navigating in the course holding mode or the traveling direction maintaining mode;

the course adjusting switches include first and second course adjusting switches corresponding to starboard and port of the marine vessel;

the first course adjusting switch to change the course toward the starboard is located on a starboard side of the steering wheel when the marine vessel is moving straight;

the second course adjusting switch to change the course toward the port is located on a port side of the steering wheel when the marine vessel is moving straight; and when a marine vessel operator rotates a wheel portion of the steering wheel by a predetermined amount or more, the course holding mode or the traveling direction maintaining mode is released.

* * * * *